US012671709B2

(12) United States Patent
Yang

(10) Patent No.: US 12,671,709 B2
(45) Date of Patent: Jun. 30, 2026

(54) NETWORK ANOMALY DETECTION METHOD, ELECTRONIC DEVICE, AND STORAGE MEDIUM

(71) Applicant: RUIJIE NETWORKS CO., LTD., Fujian (CN)

(72) Inventor: Gang Yang, Fujian (CN)

(73) Assignee: RUIJIE NETWORKS CO., LTD., Fujian (CN)

( * ) Notice: Subject to any disclaimer, the term of this patent is extended or adjusted under 35 U.S.C. 154(b) by 47 days.

(21) Appl. No.: 18/786,542

(22) Filed: Jul. 28, 2024

(65) Prior Publication Data

US 2024/0388594 A1 Nov. 21, 2024

Related U.S. Application Data

(63) Continuation of application No. PCT/CN2023/129178, filed on Nov. 1, 2023.

(30) Foreign Application Priority Data

Nov. 1, 2022 (CN) .......................... 202211358932.4

(51) Int. Cl.
H04L 9/00 (2022.01)
H04L 9/40 (2022.01)
(52) U.S. Cl.
CPC ................................ H04L 63/1425 (2013.01)
(58) Field of Classification Search
CPC ............. H04L 63/1425; H04L 41/0853; H04L 41/0866; H04L 41/12; H04L 41/14; H04L 43/0817; H04L 41/0677; H04L 45/74; H04L 41/0803
See application file for complete search history.

(56) References Cited

U.S. PATENT DOCUMENTS

| | | | |
|---|---|---|---|
| 10,666,544 B1 | 5/2020 | Robinson, Jr. et al. | |
| 2008/0162390 A1 | 7/2008 | Kapoor et al. | |
| 2013/0347103 A1 | 12/2013 | Veteikis et al. | |
| 2016/0337187 A1 | 11/2016 | Gopalarathnam et al. | |

(Continued)

FOREIGN PATENT DOCUMENTS

| | | |
|---|---|---|
| CN | 103957138 | 7/2014 |
| CN | 104378313 | 2/2015 |
| CN | 104734874 | 6/2015 |

(Continued)

OTHER PUBLICATIONS

"International Search Report (Form PCT/ISA/210) of PCT/CN2023/129178," mailed on Jan. 20, 2024, with English translation thereof, pp. 1-6.

(Continued)

*Primary Examiner* — Syed M Ahsan
(74) *Attorney, Agent, or Firm* — JCIPRNET

(57) ABSTRACT

Embodiments of this application provide a network anomaly detection method, an electronic device, and a storage medium. The method includes: determining whether a target network device in a to-be-detected network has target port configuration information corresponding to routing and forwarding based on a layer 3 Internet Protocol IP address; and determining, based on the target port configuration information, whether the to-be-detected network is anomalous.

19 Claims, 7 Drawing Sheets

(56) References Cited

U.S. PATENT DOCUMENTS

2020/0389477 A1* 12/2020 Ambrosi ................ H04L 41/28
2021/0218630 A1    7/2021 Lu et al.

FOREIGN PATENT DOCUMENTS

| CN | 109067561 |   | 12/2018 |
|----|-----------|---|---------|
| CN | 109889547 |   | 6/2019  |
| CN | 111034123 |   | 4/2020  |
| CN | 107566320 |   | 5/2020  |
| CN | 107566320 B | * | 5/2020  |
| CN | 112235148 |   | 1/2021  |
| CN | 112953737 |   | 6/2021  |
| CN | 110149343 |   | 7/2021  |
| CN | 114157554 |   | 3/2022  |

OTHER PUBLICATIONS

"Written Opinion of the International Searching Authority (Form PCT/ISA/237) of PCT/CN2023/129178," mailed on Jan. 20, 2024, with English translation thereof, pp. 1-5.

Juniper Apstra, "Apstra Documentation, Release 3.3.0", Jun. 7, 2021, Available at: https://www.juniper.net/documentation/us/en/software/apstra/apstra3.3.0/_static/Apstra_33_Docs.pdf.

"First Office Action of China Counterpart Application", issued on Nov. 7, 2025, with English translation thereof, p. 1-p. 12.

"Search Report of Europe Counterpart Application", issued on Oct. 29, 2025, p. 1-p. 11.

* cited by examiner

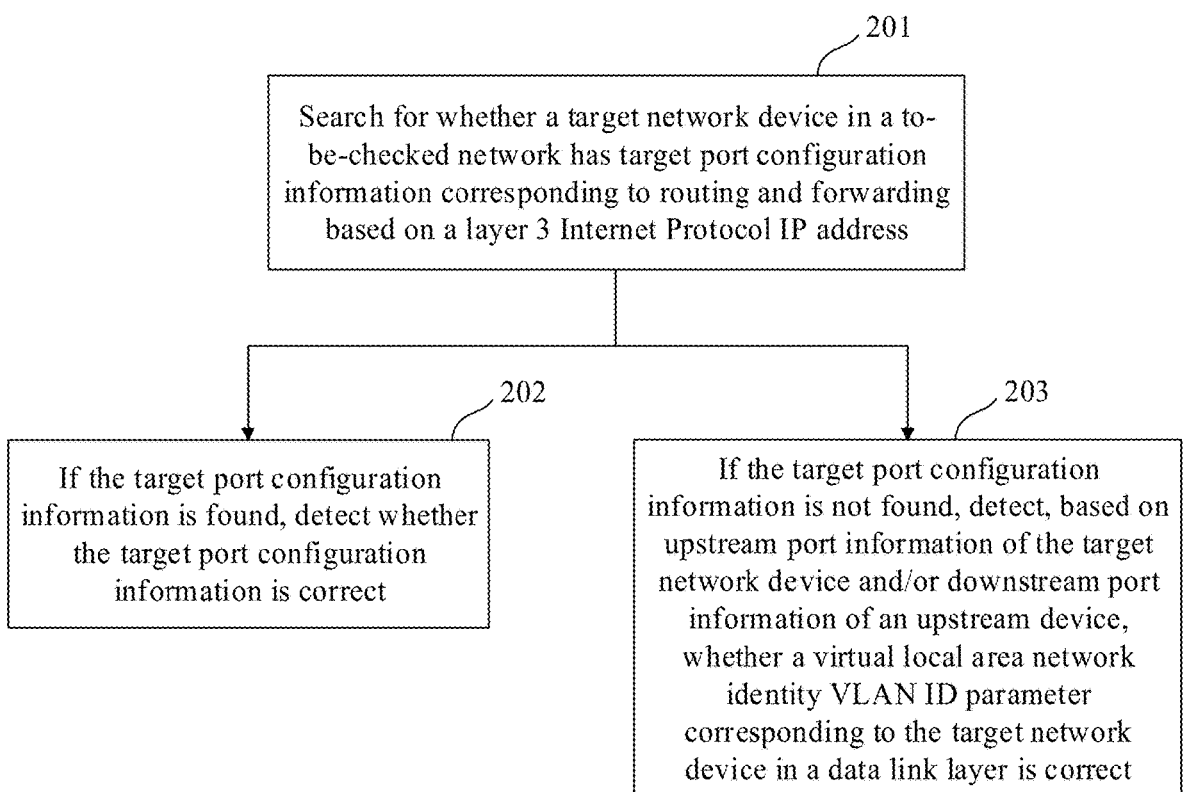

201

Search for whether a target network device in a to-
be-checked network has target port configuration
information corresponding to routing and forwarding
based on a layer 3 Internet Protocol IP address

202

If the target port configuration
information is found, detect whether
the target port configuration
information is correct

203

If the target port configuration
information is not found, detect, based on
upstream port information of the target
network device and/or downstream port
information of an upstream device,
whether a virtual local area network
identity VLAN ID parameter
corresponding to the target network
device in a data link layer is correct

FIG. 2

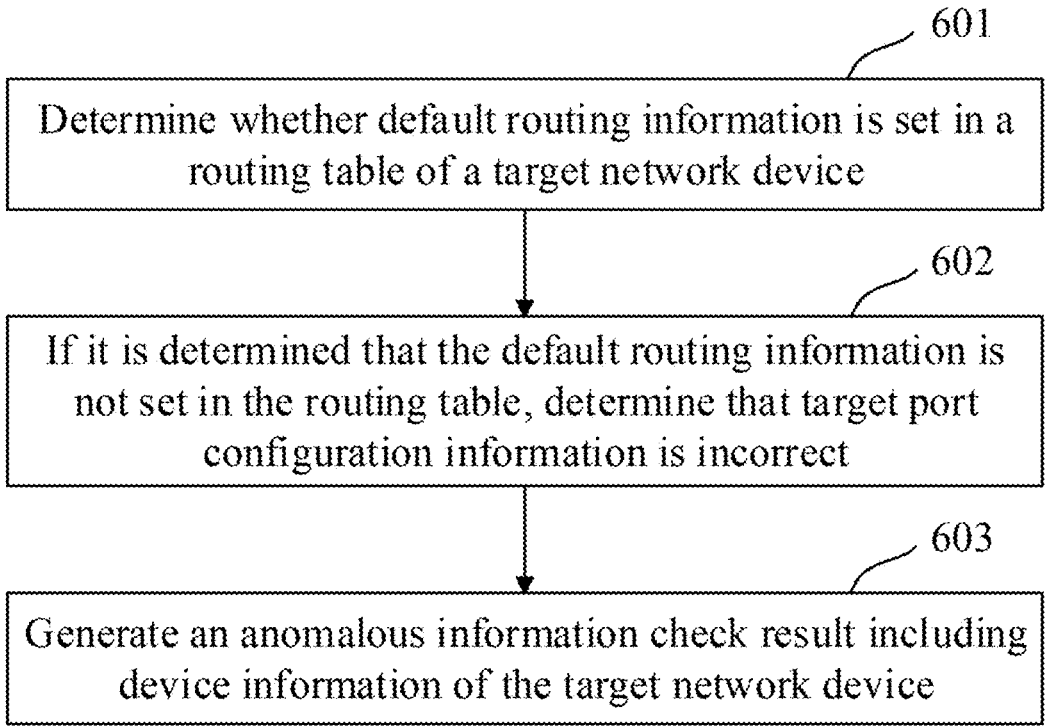

601

Determine whether default routing information is set in a routing table of a target network device

602

If it is determined that the default routing information is not set in the routing table, determine that target port configuration information is incorrect

603

Generate an anomalous information check result including device information of the target network device

FIG. 6

NETWORK ANOMALY DETECTION METHOD, ELECTRONIC DEVICE, AND STORAGE MEDIUM

CROSS-REFERENCE TO RELATED APPLICATIONS

This application is a continuation of the International Patent Application No. PCT/CN2023/129178, filed on Nov. 1, 2023 and entitled "NETWORK ANOMALY DETECTION METHOD AND APPARATUS, DEVICE, AND MEDIUM", which claims priority to Chinese Patent Application No. 202211358932.4, filed with the China National Intellectual Property Administration on Nov. 1, 2022 and entitled "NETWORK ANOMALY CHECK METHOD AND APPARATUS, DEVICE AND MEDIUM", both of which are incorporated herein by reference in their entireties.

TECHNICAL FIELD

This application relates to the field of data communications, and in particular, to a network anomaly detection method, an electronic device, and a non-volatile machine-readable storage medium.

BACKGROUND

With development of network technologies, some enterprises often need to build small networks. A small network of an enterprise may be divided into network units of different departments such as a monitoring department, a marketing department, and a research and development department. For each network device in the small network, it is necessary to configure gateway routing, a switch virtual local area network (VLAN) identity, a Dynamic Host Configuration Protocol (DHCP) server, a wireless Service Set Identifier (SSID), and the like, so that the network units of the departments and the small network formed by the network units can work normally.

SUMMARY

Various aspects of exemplary embodiments of this application provide a network anomaly detection method and apparatus, a device, and a medium.

According to a first aspect, an embodiment of this application provides a network anomaly detection method. The method includes:

determining whether a target network device in a to-be-detected network has target port configuration information corresponding to routing and forwarding based on a layer 3 Internet Protocol IP address; and determining, based on the target port configuration information, whether the to-be-detected network is anomalous.

In an embodiment, the determining, based on the target port configuration information, whether the to-be-detected network is anomalous includes:

when determining that the target port configuration information exists, detecting whether the target port configuration information is correct; and when the target port configuration information is incorrect, determining that the to-be-detected network is anomalous.

In an embodiment, the determining that the target port configuration information exists includes:

when the target port configuration information is found, determining that the target port configuration information exists.

In an embodiment, the determining, based on the target port configuration information, whether the to-be-detected network is anomalous includes:

when determining that the target port configuration information does not exist, detecting, based on upstream port information of the target network device and/or downstream port information of an upstream device, whether a virtual local area network identity VLAN ID parameter corresponding to the target network device in a data link layer is correct; and when the VLAN ID parameter corresponding to the target network device in the data link layer is incorrect, determining that the to-be-detected network is anomalous.

In an embodiment, the determining that the target port configuration information does not exist includes:

when the target port configuration information is not found, determining that the target port configuration information does not exist.

In an embodiment, the detecting, based on the upstream port information of the target network device and/or the downstream port information of the upstream device, whether the VLAN ID parameter corresponding to the target network device in the data link layer is correct includes:

detecting a VLAN ID parameter corresponding to the upstream port information of the target network device;

when a detection result for the VLAN ID parameter corresponding to the upstream port information of the target network device is success, detecting a VLAN ID parameter corresponding to the downstream port information of the upstream device of the target network device; and when a detection result for the VLAN ID parameter corresponding to the downstream port information of the upstream device of the target network device is success, determining that the VLAN ID parameter of the target network device in the data link layer is correct.

In an embodiment, the detecting the VLAN ID parameter corresponding to the upstream port information of the target network device includes:

configuring a preset value for the VLAN ID parameter corresponding to the upstream port information of the target network device;

transmitting a packet based on the target network device, and obtaining first detection information, where the first detection information includes a first corresponding value of the VLAN ID parameter corresponding to the upstream port information; and detecting whether the first corresponding value is equal to the preset value; and the detecting, based on the upstream port information of the target network device, whether the VLAN ID parameter corresponding to the target network device in the data link layer is correct further includes:

when the first corresponding value is not equal to the preset value, the detection result for the VLAN ID parameter corresponding to the upstream port information is failure; and the determining whether the to-be-detected network is anomalous includes:

when the detection result for the VLAN ID parameter corresponding to the upstream port information is failure, determining that the upstream port information is anomalous; and generating a first anomalous information detection result, where the first anomalous information detection result includes the upstream port information of the target network device.

In an embodiment, the detecting the VLAN ID parameter corresponding to the downstream port information of the upstream device of the target network device includes:

transmitting a packet based on the target network device, and obtaining second detection information, where the second detection information includes a second corresponding value of the VLAN ID parameter corresponding to the downstream port information of the upstream device; and when the second corresponding value is not zero, detecting whether the second corresponding value is equal to the preset value;

the detecting, based on the downstream port information of the upstream device of the target network device, whether the VLAN ID parameter corresponding to the target network device in the data link layer is correct includes:

when the second corresponding value is not equal to the preset value, the detection result for the VLAN ID parameter corresponding to the downstream port information of the upstream device is failure; and the determining whether the to-be-detected network is anomalous includes:

when the detection result for the VLAN ID parameter corresponding to the downstream port information of the upstream device is failure, determining that the downstream port information of the upstream device of the target network device is anomalous; and generating a second anomalous information detection result, where the second anomalous information detection result includes the downstream port information of the upstream device of the target network device.

In an embodiment, the method further includes:

when determining that a third corresponding value included in third detection information of the to-be-detected network does not correspond to a default value of the VLAN ID parameter corresponding to the upstream port information, generating an anomalous information detection result including the upstream port information of the target network device; or when determining that a fourth corresponding value included in fourth detection information of the to-be-detected network does not correspond to a default value of the VLAN ID parameter corresponding to the downstream port information of the upstream device, generating an anomalous information detection result including the downstream port information of the upstream device of the target network device.

In an embodiment, the detecting whether the target port configuration information is correct when the target port configuration information is found includes:

determining whether default routing information is set in a routing table of the target network device;

when determining that the default routing information is not set in the routing table, determining that the target port configuration information is incorrect; and generating a third anomalous information detection result, where the third anomalous information detection result includes device information of the target network device.

In an embodiment, the method further includes:

when determining that the default routing information is set in the routing table, determining whether the default routing information includes an IP address in the target port configuration information;

when determining that the default routing information includes the IP address in the target port configuration information, determining whether the routing table includes a return route and a next hop address of the return route; and when determining that the routing table does not include the return route and the next hop address of the return route, generating the third anomalous information detection result.

In an embodiment, the method further includes:

generating a network topology diagram based on a network topology structure of the to-be-detected network; and displaying each anomalous information detection result in the network topology diagram.

In an embodiment, the determining whether the target network device in the to-be-detected network has the target port configuration information corresponding to routing and forwarding based on the layer 3 Internet Protocol IP address includes:

obtaining device information of the target network device;

determining whether the device information includes routing interface configuration information and/or switch virtual interface configuration information; and if yes, determining that the target network device has the target port configuration information; or if no, determining that the target network device does not have the target port configuration information.

In an embodiment, the determining whether the target network device in the to-be-detected network has the target port configuration information corresponding to routing and forwarding based on the layer 3 Internet Protocol IP address includes:

obtaining device information of the target network device;

determining, by searching, whether the device information includes routing interface configuration information and/or switch virtual interface configuration information; and if yes, finding the target port configuration information; or if no, failing to find the target port configuration information.

In an embodiment, the finding the target port configuration information if yes includes:

when the target network device has a routing interface, finding the target port configuration information; and/or when the target network device has a switch virtual interface, finding the target port configuration information.

In an embodiment, the failing to find the target port configuration information if no includes:

when the information of the target network device does not include the routing interface configuration information and the switch virtual interface configuration information, failing to find the target port configuration information.

In an embodiment, the determining whether the target network device in the to-be-detected network has the target port configuration information corresponding to routing and forwarding based on the layer 3 Internet Protocol IP address includes:

determining, by searching, whether the target network device in the to-be-detected network has the target port configuration information corresponding to routing and forwarding based on the layer 3 Internet Protocol IP address.

According to a second aspect, an embodiment of this application provides a network anomaly detection apparatus. The apparatus includes:

a search module, configured to determine whether a target network device in a to-be-detected network has target port configuration information corresponding to routing and forwarding based on a layer 3 Internet Protocol IP address; and a detection module, configured to determine, based on the target port configuration information, whether the to-be-detected network is anomalous.

In an embodiment, the detection module is specifically configured to:

when it is determined that the target port configuration information exists, detect whether the target port configuration information is correct; and when the target port configuration information is incorrect, determine that the to-be-detected network is anomalous.

In an embodiment, the search module is specifically configured to:

when the target port configuration information is found, determine that the target port configuration information exists.

In an embodiment, the detection module is specifically configured to:

when it is determined that the target port configuration information does not exist, detect, based on upstream port information of the target network device and/or downstream port information of an upstream device, whether a virtual local area network identity VLAN ID parameter corresponding to the target network device in a data link layer is correct; and when the VLAN ID parameter corresponding to the target network device in the data link layer is incorrect, determine that the to-be-detected network is anomalous.

In an embodiment, the search module is specifically configured to:

when the target port configuration information is not found, determine that the target port configuration information does not exist.

In an embodiment, when detecting, based on the upstream port information of the target network device and/or the downstream port information of the upstream device, whether the VLAN ID parameter corresponding to the target network device in the data link layer is correct, the detection module is specifically configured to:

detect a VLAN ID parameter corresponding to the upstream port information of the target network device;

when a detection result for the VLAN ID parameter corresponding to the upstream port information of the target network device is success, detect a VLAN ID parameter corresponding to the downstream port information of the upstream device of the target network device; and when a detection result for the VLAN ID parameter corresponding to the downstream port information of the upstream device of the target network device is success, determine that the VLAN ID parameter of the target network device in the data link layer is correct.

In an embodiment, the detection module is configured to detect the VLAN ID parameter corresponding to the upstream port information of the target network device, includes:

configuring a preset value for the VLAN ID parameter corresponding to the upstream port information of the target network device;

transmitting a packet based on the target network device, and obtaining first detection information, where the first detection information includes a first corresponding value of the VLAN ID parameter corresponding to the upstream port information; and detecting whether the first corresponding value is equal to the preset value; and the detection module is configured to detect, based on the upstream port information of the target network device, whether the VLAN ID parameter corresponding to the target network device in the data link layer is correct further, includes:

when the first corresponding value is not equal to the preset value, the detection result for the VLAN ID parameter corresponding to the upstream port information is failure; and the detection module is configured to determine whether the to-be-detected network is anomalous includes:

when the detection result for the VLAN ID parameter corresponding to the upstream port information is failure, determining that the upstream port information is anomalous; and generating a first anomalous information detection result, where the first anomalous information detection result includes the upstream port information of the target network device.

In an embodiment, the detecting, by the detection module, the VLAN ID parameter corresponding to the downstream port information of the upstream device of the target network device includes:

transmitting a packet based on the target network device, and obtaining second detection information, where the second detection information includes a second corresponding value of the VLAN ID parameter corresponding to the downstream port information of the upstream device; and when the second corresponding value is not zero, detecting whether the second corresponding value is equal to the preset value;

the detecting, by the detection module based on the downstream port information of the upstream device of the target network device, whether the VLAN ID parameter corresponding to the target network device in the data link layer is correct includes:

when the second corresponding value is not equal to the preset value, the detection result for the VLAN ID parameter corresponding to the downstream port information of the upstream device is failure; and the determining whether the to-be-detected network is anomalous includes:

when the detection result for the VLAN ID parameter corresponding to the downstream port information of the upstream device is failure, determining that the downstream port information of the upstream device of the target network device is anomalous; and generating a second anomalous information detection result, where the second anomalous information detection result includes the downstream port information of the upstream device of the target network device.

In an embodiment, the detection module is further configured to:

when determining that a third corresponding value included in third detection information of the to-be-detected network does not correspond to a default value of the VLAN ID parameter corresponding to the upstream port information, generate an anomalous information detection result including the upstream port information of the target network device; or when determining that a fourth corresponding value included in fourth detection information of the to-be-detected network does not correspond to a default value of the VLAN ID parameter corresponding to the downstream port information of the upstream device, generate an anomalous information detection result including the downstream port information of the upstream device of the target network device.

In an embodiment, the detecting, by the detection module, whether the target port configuration information is correct when the target port configuration information is found includes:

determining whether default routing information is set in a routing table of the target network device;

when determining that the default routing information is not set in the routing table, determining that the target port configuration information is incorrect; and generating a third anomalous information detection result, where the third anomalous information detection result includes device information of the target network device.

In an embodiment, the detection module is further configured to:

when determining that the default routing information is set in the routing table, determine whether the default routing information includes an IP address in the target port configuration information;

when determining that the default routing information includes the IP address in the target port configuration information, determine whether the routing table includes a return route and a next hop address of the return route; and when determining that the routing table does not include the return route and the next hop address of the return route, generate the third anomalous information detection result.

In an embodiment, when determining whether the target network device in the to-be-detected network has the target port configuration information corresponding to routing and forwarding based on the layer 3 Internet Protocol IP address, the search module is specifically configured to:

obtain device information of the target network device;

determine whether the device information includes routing interface configuration information and/or switch virtual interface configuration information; and if yes, determine that the target network device has the target port configuration information; or if no, determine that the target network device does not have the target port configuration information.

In an embodiment, when determining whether the target network device in the to-be-detected network has the target port configuration information corresponding to routing and forwarding based on the layer 3 Internet Protocol IP address, the search module is specifically configured to:

obtain device information of the target network device;

determine, by searching, whether the device information includes routing interface configuration information and/or switch virtual interface configuration information; and if yes, find the target port configuration information; or if no, fail to find the target port configuration information.

In an embodiment, the search module is specifically configured to:

when the target network device has a routing interface, find the target port configuration information; and/or when the target network device has a switch virtual interface, find the target port configuration information.

In an embodiment, the search module is specifically configured to:

when the information of the target network device does not include the routing interface configuration information and the switch virtual interface configuration information, fail to find the target port configuration information.

In an embodiment, when determining whether the target network device in the to-be-detected network has the target port configuration information corresponding to routing and forwarding based on the layer 3 Internet Protocol IP address, the search module is specifically configured to:

determine, by searching, whether the target network device in the to-be-detected network has the target port configuration information corresponding to routing and forwarding based on the layer 3 Internet Protocol IP address.

In an embodiment, the network topology diagram includes a network topology tree diagram and an anomalous list; and the apparatus further includes a display module, configured to display various network devices and device information of various network devices in the network topology tree diagram; and display various device information and various anomalous information in the anomalous list.

According to a third aspect, an embodiment of this application provides an electronic device, including a memory and a processor, where the memory is configured to store a program; and the processor is coupled to the memory, and configured to execute the program stored in the memory, to implement the method according to the first aspect.

According to a fourth aspect, an embodiment of this application provides a non-volatile machine-readable storage medium, where the non-volatile machine-readable storage medium stores executable code, and when the executable code is executed by a processor of an electronic device, the processor is enabled to perform the method according to the first aspect.

In some embodiments of this application, a search is performed to determine whether the target network device in the to-be-detected network has the target port configuration information corresponding to routing and forwarding based on the layer 3 Internet Protocol IP address; and if the target port configuration information is found, whether the target port configuration information is correct is detected; or if the target port configuration information is not found, whether the virtual local area network identity VLAN ID parameter corresponding to the target network device in the data link layer is correct is detected based on the upstream port information of the target network device and/or the downstream port information of the upstream device. According to the foregoing solution, after the device information and port configuration information are obtained, different port configurations of the network device may be detected layer by layer, so that a network device configuration anomaly can be quickly located.

Other features and advantages of this application will be set forth later in the specification, and in part will be readily apparent from the specification, or may be understood by implementing this application. Objectives and other advantages of this application may be achieved and obtained by using a structure particularly stated in the written specification, claims, and accompanying drawings.

BRIEF DESCRIPTION OF DRAWINGS

To describe the technical solutions in the embodiments of this application or in the prior art more clearly, the following briefly describes the accompanying drawings required for describing the embodiments or the prior art. Apparently, the accompanying drawings in the following description show merely some of the embodiments of this application, and a person of ordinary skill in the art may still derive other drawings of embodiments from these accompanying drawings without creative efforts.

The accompanying drawings described herein are intended for better understanding of this application, and constitute a part of this application. Exemplary embodiments and descriptions thereof in this application are intended to interpret this application and do not constitute any improper limitation on this application.

FIG. 2 is a schematic flowchart of a network anomaly detection method according to an embodiment of this application.

FIG. 6 is a schematic flowchart of a method for detecting an anomaly at a network layer of a device according to an embodiment of this application.

DESCRIPTION OF EMBODIMENTS

To make the objectives, technical solutions, and advantages of the embodiments of this application clearer, the following clearly and thoroughly describes the technical solutions of this application with reference to the accompanying drawings in the embodiments of this application. Apparently, the described embodiments are some but not all of the embodiments of this application. All other embodiments obtained by a person of ordinary skill in the art based on the embodiments described in this application document without creative efforts shall fall within the protection scope of the technical solutions of this application.

In the specification, claims, and accompanying drawings of this application, the terms "first" and "second" are used to distinguish between different objects, and not intended to describe a specific order. In addition, the term "include" and any other variant thereof are intended to cover non-exclusive protection. For example, a process, method, system, product, or device that includes a list of steps or units is not limited to the listed steps or units, but optionally includes steps or units not listed, or optionally includes other steps or units inherent to the process, method, system, product, or device. The term "a plurality of" in this application may mean at least two, for example, two, three, or more. However, the embodiments of this application are not limited thereto.

In addition, the term "and/or" in this specification describes only an association relationship for describing associated objects and represents that three relationships may exist. For example, A and/or B may represent the following three cases: Only A exists, both A and B exist, and only B exists. In addition, unless otherwise specified, the character "/" in this specification usually indicates an "or" relationship between associated objects.

With development of network technologies, some enterprises often need to build small networks. Management software may be set on a cloud platform to manage the small networks of these enterprises, so that the management is capable of being remotely configured, and that a device status can be remotely monitored and inspected. In a process of configuring network devices, if a configuration error occurs in a step, a network anomaly may be caused. In particular, any configuration added or modified by a maintenance user may affect stability of an existing network. If a network device configuration is anomalous, it is usually necessary for a professional technician to perform tedious detection (or inspection) work, which consumes a lot of manpower, material resources, and time.

Figure 1:
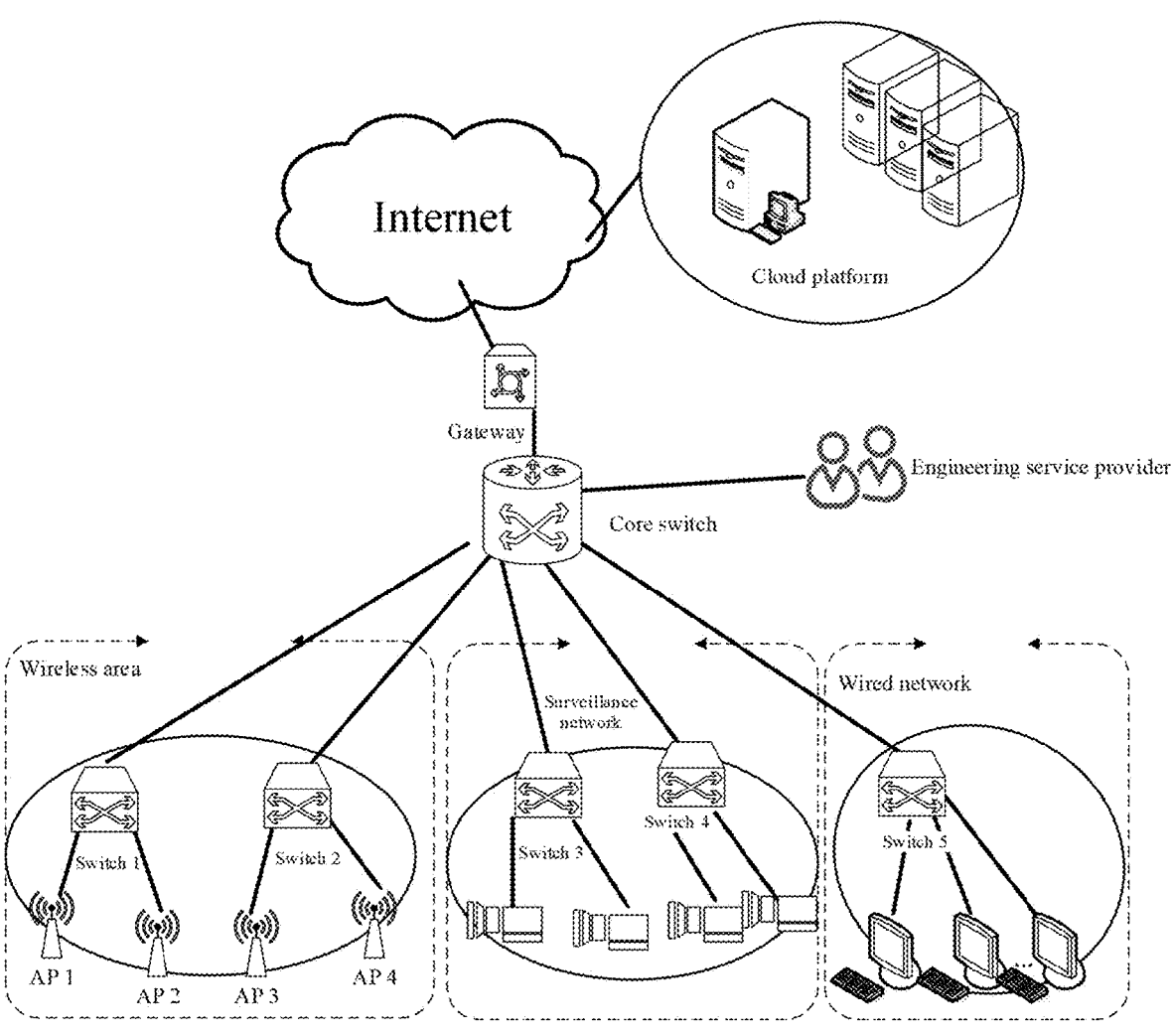
FIG. 1 is a schematic structural diagram of a network management system based on a cloud platform according to an embodiment of this application.

FIG. 1 is a schematic structural diagram of a network management system based on a cloud platform according to an embodiment of this application. As can be seen from FIG. 1, management software is installed in the cloud platform, and the management software can manage network devices. The cloud platform is connected to devices in a network (for example, devices in a wireless area, devices in a surveillance network, and devices in a wired network) by using a gateway device and a core switch, thereby monitoring a running status of each switch in the network. In a process of configuring these network devices, if a configuration error occurs in a step, a service network anomaly may be caused. In particular, any configuration added or modified by a maintenance user may affect the existing network. If an anomaly occurs, detection needs to be performed by professionals who understand networking knowledge such as a Virtual Local Area Networks (VLAN), an Internet Protocol (IP) address, and routing. The detection process is tedious and consumes a lot of manpower, material resources, and time. Therefore, exemplary embodiments of this application provide a solution that can quickly detect layer-2 and-layer-3 network configuration problems, to improve efficiency of checking network configuration problems. Unless otherwise defined in the context, the term "layer 2" in this application refers to a "data link layer" and "layer 3" refers to a "network layer". The term "layer-2-and-layer-3 networks" in this application refers to a layer 2 network and a layer 3 network.

The technical solutions provided in the embodiments of this application are hereinafter described in detail with reference to the accompanying drawings.

An embodiment of this application provides a network anomaly detection method. The method includes the following steps.

Step 101: Determine whether a target network device in a to-be-detected network has target port configuration information corresponding to routing and forwarding based on an IP address.

Step 102: Determine, based on the target port configuration information, whether the to-be-detected network is anomalous.

The target port configuration information refers to information used to configure a target port as an interface.

The interface may be an interface used for routing. The interface used for routing includes a physical routing interface and a virtual routing interface.

Further, in an embodiment of this application, the target port configuration information may include routing interface configuration information and/or switch virtual interface configuration information.

FIG. 2 is a schematic flowchart of a network anomaly detection method according to an embodiment of this application. As can be seen from FIG. 2, the method includes the following steps.

Step 201: Determine, by searching, whether a target network device in a to-be-detected network has target port configuration information corresponding to routing and forwarding based on an IP address.

Specifically, in an embodiment of this application, the target port configuration information may include routing interface configuration information and/or switch virtual interface configuration information.

Step 202: If the target port configuration information is found, detect whether the target port configuration information is correct.

Step 203: If the target port configuration information is not found, detect, based on upstream port information of the target network device and/or downstream port information of an upstream device, whether a VLAN ID parameter corresponding to the target network device in a data link layer is correct.

In the IEEE 802.1q standard, a VLAN is defined as adding a tag (including a VLAN ID and other information) after an Ethernet header. The Virtual Local Area Network Identity (VLAN ID) represents a number of a VLAN to which a data frame belongs. A value range of the VLAN ID is 0 to 4095. Because 0 and 4095 are values reserved in a standard protocol, a valid value range of the VLAN ID is 1 to 4094.

In the solution of this application, for enabling comprehensive monitoring of all network devices in the network by using a cloud platform, all devices that need to be monitored are required to be added to the cloud platform. The cloud platform may collect information related to these added network devices, where the related information includes but is not limited to Media Access Control (MAC) addresses, a device MAC address table, an Address Resolution Protocol (ARP) table, and the like. A network topology path shown in FIG. 3 may be obtained through calculation based on the MAC addresses, the ARP table, and the like by using an algorithm. The collected related information may be classified into device information, the network topology path, and the target port configuration information according to categories.

For example, related information of layer-2-related (data-link-layer-related) devices may be collected. The layer-2-related devices include switches, gateways, and wireless AP devices. Related information of a switch includes a virtual local area network VLAN added in the switch, as well as a VLAN type (which may be access or trunk), a VLAN ID, and a VLAN (allow vlan) allowed to pass through each port of the switch. Related information of a gateway includes information for a VLAN allowed to pass through each port of the gateway. Related information of a wireless AP device includes VLAN information associated with an SSID.

Information of layer-3 (network-layer)-related devices may also be collected. The layer-3-related devices include switches and gateways. Related information of a switch includes a Switch Virtual Interface (SVI), a routing interface, and DHCP. Related information of a gateway includes DHCP, address pool information, and VLAN information of the gateway.

Figure 3:
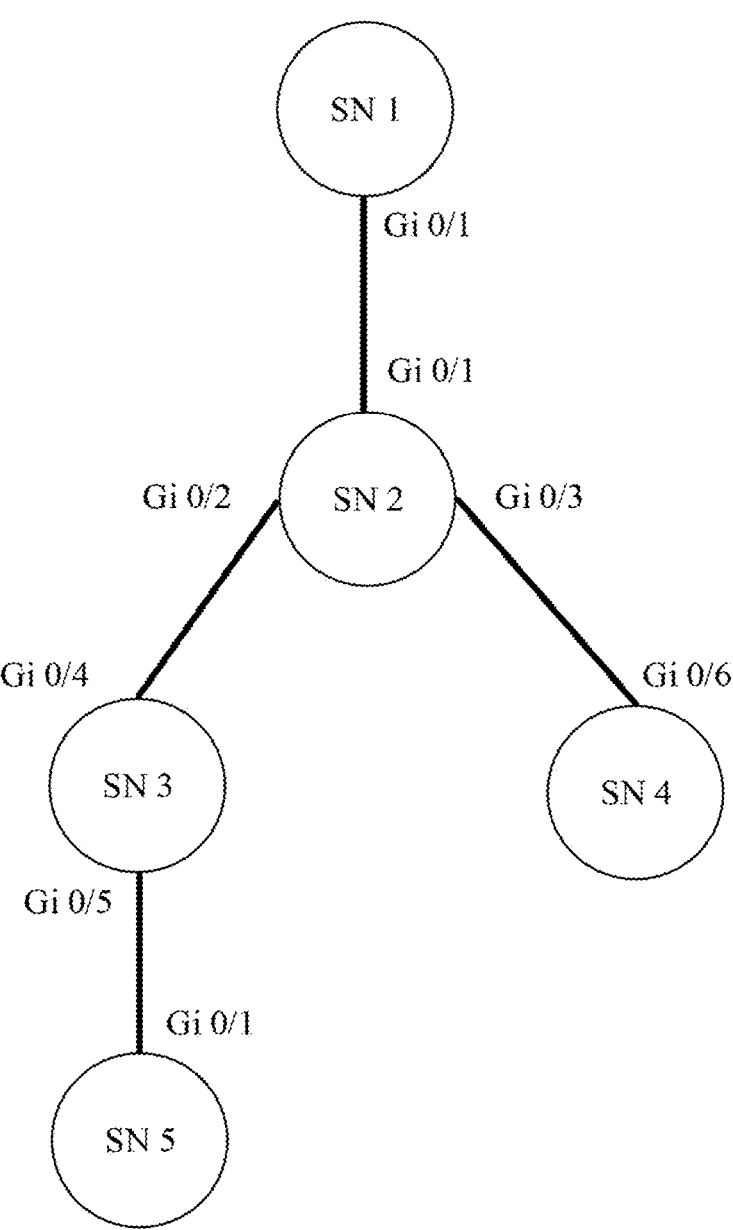
FIG. 3 is a schematic diagram of a network topology path according to an embodiment of this application.

After the foregoing information is obtained, further processing may be performed to generate a temporary information table bizMAPTemp. The information is stored in a key-value form in the table. The key is a device serial number (SN) and the value is BizMapInfo (that is, bizInfo information). FIG. 3 is a schematic diagram of the network topology path according to an embodiment of this application. As can be seen from FIG. 3, the BizMapInfo may include the following information: the upstream port information, the downstream port information of the upstream device, SSID information of a wireless device, VLAN ID parameters, the network topology path, and the target port configuration information. The upstream port information includes a port name, a port VLAN ID, a VLAN allowed to pass, and a port type. The downstream port information of the upstream device includes a port name, a port VLAN ID, a VLAN allowed to pass, and a port type. Layer 3 network port information includes a routing table, an Internet Protocol IP address of a device, and the like. The network topology includes five network devices identified by device serial numbers: SN 5, SN 4, SN 3, SN 2, and SN 1, where Gi*/* represents a port name of the device. Further, based on network topology decoupling, the network topology paths including network devices may be determined (for example, a network topology path may be: SN 5, SN 3, SN 2, and SN 1), so that anomaly detection is performed on the network devices based on the network topology path (according to a transmission rule of a packet transmission path from a root node to a leaf node or from a leaf node to a root node).

When anomaly detection is performed, detection may be performed based on the network devices and the network topology path corresponding to the network devices. Because many network devices in the network need to be detected, after detection work on one network device (a specific detection process is described in detail in the following embodiment) is completed, corresponding detection may continue to be performed on a next network device. In this way, comprehensive anomaly detection is performed on layer-2-and-layer-3 networks (for example, network devices in the layer-2-and-layer-3-networks) of the network devices in the entire network, and network devices with layer 2 or layer 3 anomalies are correctly marked based on the network topology path (in the following embodiment, a network device is used as an example for detailed description; and other network devices are detected by using the same method and details are not repeated herein).

Figures 4, 5:
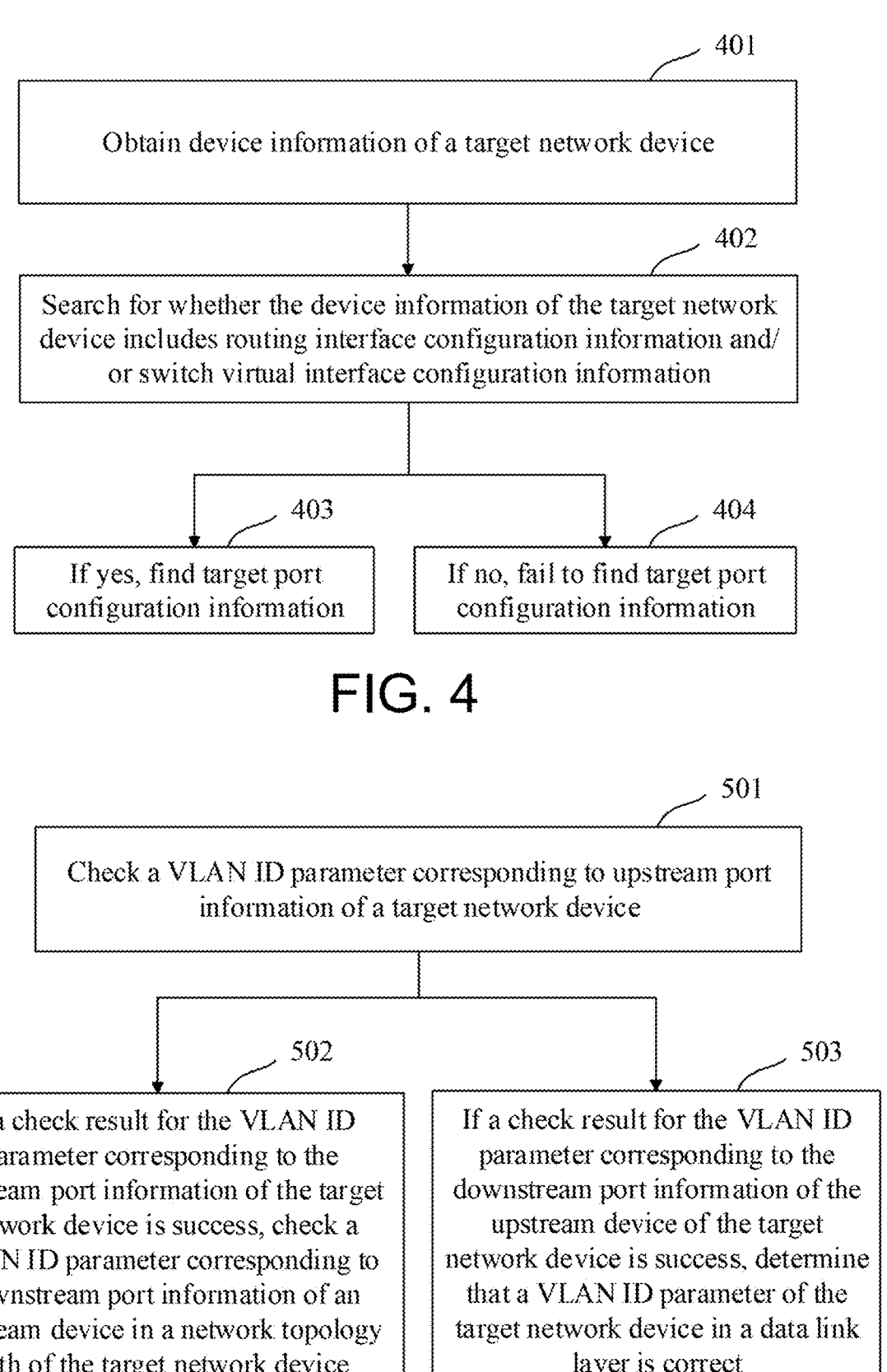
FIG. 4 is a schematic flowchart of a method for determining a layer in need of anomaly detection according to an embodiment of this application.
FIG. 5 is a schematic flowchart of a method for detecting an anomaly at a data link layer of a device according to an embodiment of this application.

It should be noted that anomalies in the layer 2 network and the layer 3 network are different. Therefore, when anomaly detection is performed on a network device in the network, the detection needs to be performed separately. FIG. 4 is a schematic flowchart of a method for determining a layer in need of anomaly detection according to an embodiment of this application. As can be seen from FIG. 4, the anomaly detection method specifically includes the following steps.

Step 401: Obtain device information of a target network device.

Step 402: Determine whether the device information of the target network device includes routing interface configuration information and/or switch virtual interface configuration information.

Step 403: If yes, find target port configuration information.

Step 404: If no, fail to find target port configuration information.

After the target network device on which anomaly detection needs to be performed is determined and the device information is obtained, it is further determined (for example, by searching) whether the device information includes the routing interface configuration information and/or the switch virtual interface configuration information. For example, it is detected whether a physical port (an upstream port, or a downstream port of an upstream device) of the network device is a routing interface and whether the network device has a switch virtual interface (SVI). If the upstream port of the target network device and/or the downstream port of the upstream device are/is a routing interface, a packet flowing through the target network device may pass through layer 3 (network layer). In this case, a route (route) tag is set as true (true), and a default IP address Pip of a temporary address is set to an IP address corresponding to the routing interface. If the port of the target network device is a switch virtual interface (SVI) and there is a Dynamic Host Configuration Protocol Server (DHCP Server), it indicates that the packet on the virtual interface may be destined for (pass through) layer 3. In this case, the route (route) tag is set as true (true), and the default IP address Pip of the temporary address is set to an IP address corresponding to the switch virtual interface SVI. If the upstream port of the network device is not a routing interface and/or the downstream port of the upstream device is not a routing interface and the network device does not have a switch virtual interface SVI whose address is a virtual local area network identity VLAN ID, that is, if the target port configuration information is not found, anomaly detection is performed on a layer 2 (data link layer) network of the network device.

In the foregoing embodiment, after the network layer or the data link layer corresponding to the target network device on which anomaly detection needs to be performed is determined, detection is performed according to packet input and output rules in the network. Specifically, after it is determined that the packet on the corresponding port of the target network device may be destined for layer 3, detection needs to be performed on layer 3. For example, anomaly detection is performed based on layer 3 port information and a network topology path of the target network device (a round-trip path from the network device to a root node and from the root node to the network device). If it is determined that the packet on the corresponding port of the target network device may not be destined for layer 3, anomaly detection is performed on the layer 2 upstream port and the downstream port of the upstream device. For example, anomaly detection is performed based on the network topology path corresponding to the target network device (the round-trip path from the network device to the root node and from the root node to the network device) according to a packet transmission rule. In the following embodiments, layer 2 anomaly detection and layer 3 anomaly detection are separately described by using examples.

One or more embodiments of this application shown in FIG. 5 provide a schematic flowchart of a method for detecting an anomaly at a data link layer of a device. Whether virtual local area network identity configuration information at a data link layer corresponding to a target network device is correct is detected based on upstream port information, downstream port information of an upstream device, and a target network topology path. The method specifically includes the following steps.

Step 501: Detect a VLAN ID parameter corresponding to the upstream port information of the target network device.

Step 502: If a detection result for the VLAN ID parameter corresponding to the upstream port information of the target network device is success, detect a VLAN ID parameter corresponding to the downstream port information of the upstream device in a network topology path of the target network device.

Step 503: If a detection result for the VLAN ID parameter corresponding to the downstream port information of the upstream device of the target network device is success, determine that the VLAN ID parameter of the target network device in the data link layer is correct.

Specifically, before detection is performed, a value is assigned to a temporary virtual local area network identity VLAN ID and is set as a default value. For example, the value of the virtual local area network identity VLAN ID is set for the network. For example, the VLAN ID is assigned a value of 100, that is, the value (100) is set as the default value of the VLAN ID, and the default value is saved by using original data originalvid.

A packet output rule mentioned herein may be understood as a rule for a packet in an actual transmission process. For example, a working mode of a port includes access/trunk/hyb. In an exemplary embodiment of this application, although no packet is actually sent, various parameter information needs to be correspondingly processed according to a processing rule for a packet VLAN ID and tag in input and output rules.

In the detection process, if the upstream port information and its corresponding VLAN ID need to be detected, the detection needs to be performed according to the packet output (out) rule. For example, in access working mode, when a packet is sent, a tag in the packet is removed first, and then the packet is sent directly. In trunk working mode, when a packet is sent, a native ID (port VLAN ID of the port in trunk mode) of the port and VLAN ID information of the packet to be sent may be compared. If the two are equal to each other, the VLAN ID information is removed and then the packet is sent. If the two are not equal to each other, the packet is sent directly.

After the upstream port information is detected, the downstream port information of the upstream device of the target network device may be detected next. Specifically, configuration information of the VLAN ID corresponding to the downstream port information of the upstream device of the target network device is detected based on the network topology path.

For example, in access working mode, when a packet is received, it is determined whether VLAN ID information exists in the packet. If no, a tag (usually a port VLAN ID, PVID) is added according to a VLAN ID allocation rule, and then the packet is forwarded. If yes, it is determined whether the VLAN ID information in the packet is equal to the PVID. If the two are not equal to each other, the packet is discarded. In trunk working mode, when a packet is received, it is determined whether VLAN ID information exists in the packet. If no, a tag (usually a native ID) is added according to the VLAN ID allocation rule, and then the packet is forwarded. If yes, processing is performed according to ingress-filtering (that is, check is performed according to a packet receiving rule of a trunk port).

In step 501, configuration information of the VLAN ID corresponding to the upstream port information of the target network device is detected based on the target network topology path according to the packet output rule.

Specifically, a preset value is configured for the VLAN ID parameter corresponding to the upstream port information of the target network device. Based on the target network device, a simulated packet transmission task is executed to obtain first detection information including a first corresponding value of the VLAN ID parameter. It is detected whether the first corresponding value is equal to a preset value. If no, it is determined that the upstream port information is anomalous. An anomalous information detection result including the upstream port information of the target network device is generated. For case of description, the anomalous information detection result is denoted as a first anomalous information detection result. If yes, namely, when a detection result for the VLAN ID parameter corresponding to the upstream port information of the target network device is success, then it is determined that a VLAN ID parameter corresponding to the downstream port information of the upstream device of the target network device.

As can be learned from above, layer-2-network-and-layer-3-network anomaly detection performed on the target network device according to a packet transmission rule is simulated without actual packet transmission in exemplary embodiments of this application. Therefore, by temporarily configuring the preset value for the VLAN ID parameter, it is possible to determine whether the upstream port information of the target network device includes the preset value. If the preset value is included and the preset value is equal to the VLAN ID corresponding to the upstream port information, the preset value is set to zero, and zero is returned, and then the VLAN ID is returned. If the preset value is not included, it indicates that the upstream port information is configured incorrectly and that there is an anomaly (for example, the VLAN ID is forgotten to be configured). To enable a user to quickly and intuitively understand the anomalous information, after the anomaly is determined, anomalous information including information such as device information and the upstream port information of the network device may be generated, so that the user can quickly determine the anomalous device and find a cause of the anomaly of the device.

In step 502, according to the packet input rule, the VLAN ID parameter corresponding to the downstream port information of the upstream device of the target network device is detected.

Specifically, based on the target network device, a simulated packet transmission task is executed to obtain second detection information including a second corresponding value of the VLAN ID parameter. It is determined whether the second corresponding value is zero. If the second corresponding value is not zero, it is detected whether the second corresponding value is equal to a preset value. If the second corresponding value is not equal to the preset value, it is determined that the downstream port information of the upstream device of the target network device is anomalous. An anomalous information detection result including the downstream port information of the upstream device of the target network device is generated. For case of description, the anomalous information detection result is denoted as a second anomalous information detection result.

If a VLAN ID value is zero, which means that a packet in an actual packet transmission process is not tagged with a tag, a VLAN ID needs to be allocated and added to the packet by using an input port (a downstream port of the upstream device). In other words, the VLAN ID is set to a virtual local area network identity of the downstream port of the upstream device.

If the value of the VLAN ID is not zero, which means that the packet in the actual packet transmission process is tagged with a tag, it is further determined whether the downstream port information of the upstream device includes a preset value. If the preset value is not included, it is determined that the downstream port information of the upstream device is configured incorrectly and that there is an anomaly (for example, the VLAN ID is forgotten to be configured). To enable the user to quickly and intuitively understand the anomalous information, after the anomaly is determined, anomalous information including information such as the device information of the target network device and the downstream port information of the upstream device may be generated, so that the user can quickly determine the anomalous device and find a cause of the anomaly of the device. If the preset value is included, namely, when a detection result for the VLAN ID parameter corresponding to the downstream port information of the upstream device of the target network device is success, it is determined that the VLAN ID parameter of the target network device in the data link layer is correct.

In one or more embodiments of this application, the network anomaly detection method further includes: if it is determined that a third corresponding value included in third detection information of the to-be-detected network does not correspond (for example, is not equal) to a default value of the VLAN ID parameter corresponding to the upstream port information, an anomalous information detection result including the upstream port information of the target network device is generated; or if it is determined that a fourth corresponding value included in fourth detection information of the to-be-detected network does not correspond (for example, is not equal) to a default value of the VLAN ID parameter corresponding to the downstream port information of the upstream device, an anomalous information detection result including the downstream port information of the upstream device of the target network device is generated.

In an actual application, packets of a plurality of VLANs may be allowed to pass through the trunk port, but the port has only one VLAN ID. The trunk port may transmit both untagged and tagged packets. If a packet is untagged, the packet is transmitted in a VLAN corresponding to the VLAN ID of the trunk port; otherwise, it is necessary to select a VLAN ID based on a tag to forward the packet.

After related detection work on the upstream port and the downstream port of the upstream device, it is further determined whether a temporary virtual local area network identity VLAN ID of a returned packet eventually received by the network is the same as the initially saved default identity (for example, the value of the original data originalvid). If the two identities are not the same, it indicates that interconnection ports exist in trunk working mode, but native IDs (PVIDs in trunk mode) of corresponding trunk ports are inconsistent. The packet is not allowed to pass through the port, and corresponding anomalous information needs to be returned.

In one or more embodiments of this application, FIG. 6 is a schematic flowchart of a method for detecting an anomaly at a network layer of a device according to an embodiment of this application. In an execution process of the detection method, detection may be performed from a target network device to a root node based on a connection relationship of each network device in a target network topology path. Based on the target network topology path, it is detected whether target port configuration information is correct. The method includes the following steps.

Step 601: Determine whether default routing information is set in a routing table of the target network device.

Step 602: If it is determined that the default routing information is not set in the routing table, determine that the target port configuration information is incorrect.

Step 603: Generate an anomalous information detection result including device information of the target network device.

For case of description, the anomalous information detection result in step 603 is denoted as a third anomalous information detection result.

As mentioned above, after whether physical ports of the target network device are an upstream port and a downstream port of an upstream device) is detected and whether the physical ports are switch virtual interfaces (SVIs) is detected, if it is found that packets on one or more physical ports or switch virtual interfaces are destined for a layer 3 network layer, anomaly detection needs to be performed on layer 3.

Specifically, a route (route) parameter is set to a default route, and a corresponding default IP address Pip is set. After it is determined that a packet on a port of the target network device needs to pass through layer 3, a variable route is marked as true. After a routing table of the target network device is obtained from obtained bizMapInfo, whether the current routing table includes default routing information may be queried. If the default routing information is included, the default routing information is set to defaultRoute. If the default routing information is not included, the target network device is marked as not configured with a static route, and anomalous information is displayed. To enable a user to quickly and intuitively understand the anomalous information, after the anomaly is determined, anomalous information including information such as device information and port information of the target network device may be generated, so that the user can quickly determine the anomalous device and find a cause of the anomaly of the device.

If it is determined that the default routing information is set in the routing table, it is determined whether the default routing information includes an IP address in the target port configuration information. If it is determined that the default routing information includes the IP address in the target port configuration information, it is determined whether the routing table includes a return route and a next hop address of the return route. If it is determined that the routing table does not include the return route and the next hop address of the return route, anomalous information including the device information of the target network device is generated.

For case of understanding, the following describes processes of detecting anomalies at layer 2 and layer 3 of a network device based on specific embodiments by using examples.

A process of detecting an anomaly at layer 2 (data link layer) is as follows:

1. Obtain bizMapInfo information of a device serial number SN from bizMAPTemp.
2. Set a temporary virtual local area network identity VLAN ID parameter, for example, set a VLAN ID to 100, and save an original data originalVid value and set this value as a default value of the VLAN ID.
3. Obtain a network topology path deviceRouteList of a network device, and perform traversal from a leaf network device to a root cyclically in order, to obtain a device serial number parameter Rsn.

a) Obtain the bizMapInfo information of the Rsn from the bizMAPTemp.
b) Determine whether the current network device has a layer 3 route, and if yes, exit the cycle.
c) Determine whether packets on an upstream port of the current device and a downstream port of an upstream device are destined for layer 3, and if yes, exit the cycle.
d) Detect the upstream port according to a port output (out) rule for a packet with a VLAN tag, and determine whether a current VLAN ID is allowed to pass.
i. Determine whether an allow vlan of the upstream port includes a VLAN ID.
(1) If the allow vlan does not include the VLAN ID, recognize that the port of the network device does not allow the service VLAN to pass, and assemble and return (return) anomalous information of the current network device.
ii. If the temporary virtual local area network identity VLAN ID is the same as the VLAN ID of the upstream port, set the temporary virtual local area network identity VLAN ID to zero.
iii. Proceed to a next step.
e) Detect the downstream port of the upstream device according to a port input (in) rule for a switch packet with a VLAN tag, and determine whether the current temporary virtual local area network identity VLAN ID is allowed to pass.
i. If the temporary virtual local area network identity VLAN ID==0, set the temporary virtual local area network identity VLAN ID to a VLAN ID of the downstream port of the upstream device, and return the VLAN ID.
ii. If the temporary virtual local area network identity VLAN ID!=0, determine whether an allow vlan of the downstream port of the upstream device includes the temporary virtual local area network identity VLAN ID.
(1) If the temporary virtual local area network identity VLAN ID is included, return the temporary virtual local area network identity VLAN ID.
(2) If the temporary virtual local area network identity VLAN ID is not included, recognize that the port of the device does not allow the service VLAN to pass, and assemble and return (return) anomalous information of the current network device.
f) Jump to step 3, and traverse a next network device.
4. Continue to read a deviceRouteList, and perform traversal from a root to a leaf network device cyclically in reverse order, to obtain an Rsn.
a) Obtain bizInfo information related to the Rsn from the bizMAPTemp.
b) Determine whether the current device has a layer 3 route, and if yes, exit the cycle.
c) Determine whether packets on an upstream port of the current device and a downstream port of an upstream device are destined for layer 3, and if yes, exit the cycle.
d) Detect the upstream port according to a port output (out) rule for a switch packet with a VLAN tag, and determine whether a current temporary virtual local area network identity VLAN ID is allowed to pass.
i. Determine whether an allow vlan of the upstream port includes the temporary virtual local area network identity VLAN ID.
(1) If the allow vlan does not include the temporary virtual local area network identity VLAN ID, recognize that the port of the device does not allow the service VLAN to pass, and assemble and return (return) anomalous information of the current network device.

ii. If the temporary virtual local area network identity VLAN ID is the same as the VLAN ID of the upstream port, set the temporary virtual local area network identity VLAN ID to zero, and return zero.

iii. Return the temporary virtual local area network identity VLAN ID.

e) Detect the downstream port of the upstream device according to a port in rule for a switch packet with a VLAN tag, and determine whether the current temporary virtual local area network identity VLAN ID is allowed to pass.

i. If the temporary virtual local area network identity VLAN ID==0, set the temporary virtual local area network identity VLAN ID to a VLAN ID of the downstream port of the upstream device, and return the VLAN ID.

ii. If the temporary virtual local area network identity VLAN ID!=0, determine whether an allow vlan of the downstream port of the upstream device includes the temporary virtual local area network identity VLAN ID.

(1) If the temporary virtual local area network identity VLAN ID is included, return the temporary virtual local area network identity VLAN ID.

(2) If the temporary virtual local area network identity VLAN ID is not included, recognize that the port of the network device does not allow the service VLAN to pass, and assemble and return (return) anomalous information of the current network device.

f) Jump to step 4, and traverse a next network device.

5. Determine whether a temporary virtual local area network identity VLAN ID==originalVid.

a) If the two are not equal to each other, which means that "interconnection ports are trunk ports, but native IDs of corresponding trunk ports are inconsistent" and that the VLAN ID is not allowed to pass, assemble and return (return) anomalous information of the current network device.

6. Return "Allowed" value.

A process of detecting an anomaly at layer 3 (network layer) is as follows:

When a route is true as determined above, that is, when a packet on a port of a network device is destined for layer 3:

Aa) Obtain corresponding bizMapInfo, obtain a routing table of the device, and obtain a default route.

i. If the default route exists, set a value of the defaultRoute.

ii. If the default route does not exist, recognize that the device is not configured with a static route, and return.

Ab) Obtain a deviceRouteList from the bizMapInfo, and perform traversal from a leaf network device to a root network device cyclically in order, to obtain an Rsn.

i. Obtain the bizMapInfo information of the Rsn from the bizMAPTemp.

ii. Obtain layer 3 port information from the bizMapInfo information, and determine, by searching, whether a corresponding IP address is equal to the defaultRoute.

(1) If the two are not equal to each other, continue and jump to Ab to continue to traverse a next node.

(2) If the two are equal to each other, check whether a return route with a next hop address configured as PIP exists in the routing table.

a) If the return route exists, continue.

b) If the return route does not exist, it is then determined that the device is not configured with a return route pointing to PIP.

Ac) Jump to step Aa, and continue to detect a next hop.

Figure 7:
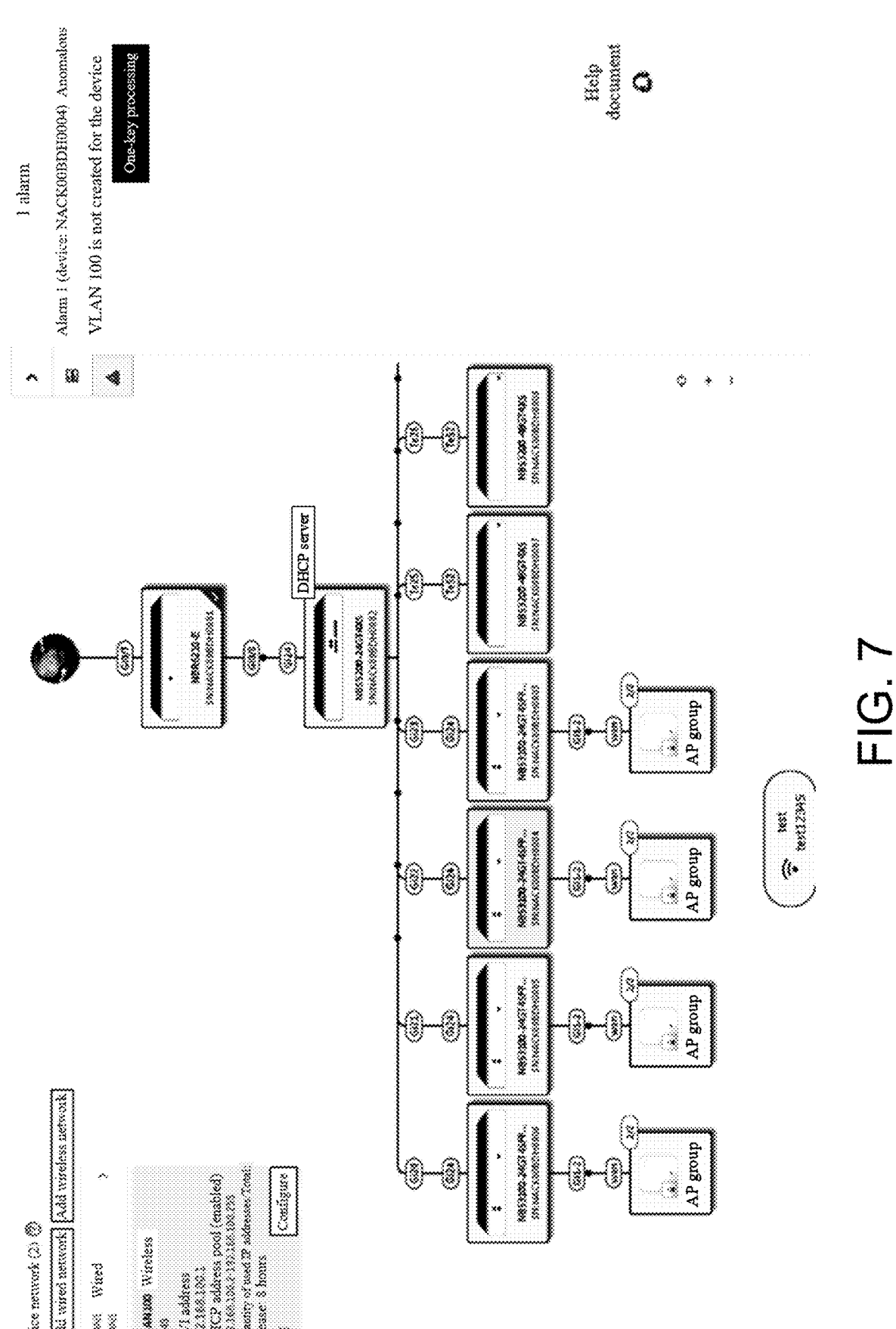
FIG. 7 is a schematic diagram for displaying anomalous information illustrated in an embodiment of this application.

FIG. 7 is a schematic diagram for displaying anomalous information illustrated in an embodiment of this application. As can be seen from FIG. 7, a network topology diagram is generated based on a topology structure of a to-be-detected network, and various anomalous information detection results are displayed in the network topology diagram. The network topology diagram can include all devices added in a cloud platform that need to be monitored. In addition, a connection relationship between various devices and device information of each device can be clearly displayed. When anomaly detection is performed, an anomalous network device may be marked in red and highlighted, so that a user can conveniently and directly find the anomalous network device after opening the network topology diagram.

In addition, in order that anomalous information obtained through network monitoring can be displayed more comprehensively, if the network topology diagram includes a network topology tree diagram and an anomalous list, the network topology diagram marked with various anomalous information is displayed, and the displaying includes: displaying various network devices and the device information of various network devices in the network topology tree diagram; and displaying various device information and various anomalous information in the anomalous list.

An anomalous list may be established separately for the anomalous information (certainly, a name of the list and a position of the list in the network topology diagram may be adjusted based on an actual requirement of a user; this is only used as an example for description and does not constitute a limitation on the technical solution of this application). The anomalous list clearly displays detailed information about an anomaly, including a device serial number SN, a cause of the anomaly, an anomalous port, and the like. The user may adjust content in the list based on an actual requirement.

Figure 8:
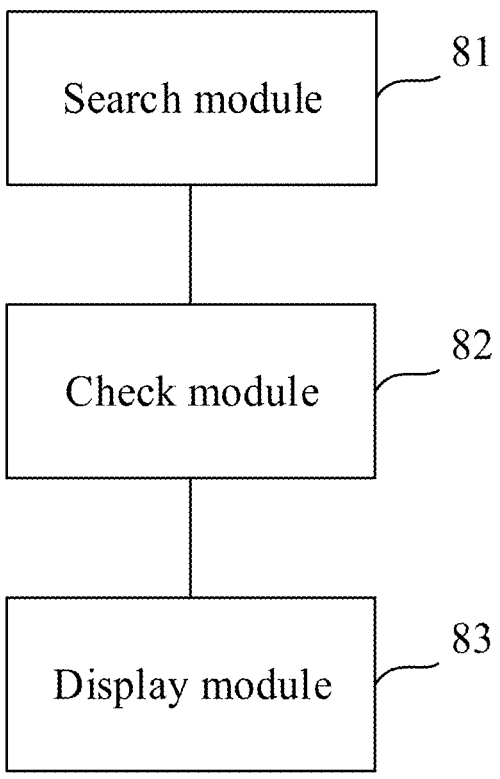
FIG. 8 is a schematic structural diagram of a network anomaly detection apparatus according to an embodiment of this application.

Based on a same idea, an embodiment of this application further provides a network anomaly detection apparatus. FIG. 8 is a schematic structural diagram of a network anomaly detection apparatus according to an embodiment of this application. As can be seen from FIG. 8, the apparatus includes:

a search module 81, configured to determine, by searching, whether a target network device in a to-be-detected network has target port configuration information corresponding to routing and forwarding based on a layer 3 Internet Protocol IP address; and a detection module 82, configured to: if the target port configuration information is found, detect whether the target port configuration information is correct; or if the target port configuration information is not found, detect, based on upstream port information of the target network device and/or downstream port information of an upstream device, whether a virtual local area network identity VLAN ID parameter corresponding to the target network device in a data link layer is correct, where the search module 81 is further configured to: obtain device information of the target network device; determine, by searching, whether the device information of the target network device includes routing interface configuration information and/or switch virtual interface configuration information; and if yes, find the target port configuration information; or if no, fail to find the target port configuration information.

Optionally, the detection module 82 is further configured to: detect a VLAN ID parameter corresponding to the upstream port information of the target network device;

if a detection result for the VLAN ID parameter corresponding to the upstream port information of the target network device is success, detect a VLAN ID parameter corresponding to the downstream port information of the upstream device of the target network device; and if a detection result for the VLAN ID parameter corresponding to the downstream port information of the upstream device of the target network device is success, determine that the VLAN ID parameter of the target network device in the data link layer is correct.

Optionally, the detection module 82 is further configured to: configure a preset value for the VLAN ID parameter corresponding to the upstream port information of the target network device; execute a simulated packet transmission task based on the target network device to obtain first detection information including a first corresponding value of the VLAN ID parameter; detect whether the first corresponding value is equal to a preset value; if no, determine that the upstream port information is anomalous; and generate an anomalous information detection result including the upstream port information of the target network device.

Optionally, the detection module 82 is further configured to: execute a simulated packet transmission task based on the target network device to obtain second detection information including a second corresponding value of the VLAN ID parameter;

determine whether the second corresponding value is zero;

if the second corresponding value is not zero, detect whether the second corresponding value is equal to a preset value;

if the second corresponding value is not equal to the preset value, determine that the downstream port information of the upstream device of the target network device is anomalous; and generate an anomalous information detection result including the downstream port information of the upstream device of the target network device.

Optionally, the detection module 82 is further configured to: if it is determined that a third corresponding value included in third detection information of the to-be-detected network does not correspond to a default value of the VLAN ID parameter corresponding to the upstream port information, generate an anomalous information detection result including the upstream port information of the target network device; or if it is determined that a fourth corresponding value included in fourth detection information of the to-be-detected network does not correspond to a default value of the VLAN ID parameter corresponding to the downstream port information of the upstream device, generate an anomalous information detection result including the downstream port information of the upstream device of the target network device.

Optionally, the detection module 82 is further configured to: determine whether default routing information is set in a routing table of the target network device;

if the default routing information is not set in the routing table, determine that the target port configuration information is incorrect; and generate an anomalous information detection result including the device information of the target network device.

Optionally, the detection module 82 is further configured to: if it is determined that the default routing information is set in the routing table, determine whether the default routing information includes an IP address in the target port configuration information;

if it is determined that the default routing information includes the IP address in the target port configuration information, determine whether the routing table includes a return route and a next hop address of the return route; and if it is determined that the routing table does not include the return route and the next hop address of the return route, generate an anomalous information detection result including the device information of the target network device.

Optionally, the apparatus further includes a display module 83, configured to: generate a network topology diagram based on a topology structure of the to-be-detected network; and display various anomalous information detection results in the network topology diagram.

Optionally, the network topology diagram includes a network topology tree diagram and an anomalous list; and the display module 83 is further configured to: display various network devices and device information of various network devices in the network topology tree diagram; and display various device information and various anomalous information in the anomalous list.

As can be learned based on the foregoing embodiment, a search is performed to determine whether the target network device in the to-be-detected network has the target port configuration information corresponding to routing and forwarding based on the layer 3 Internet Protocol IP address; and if the target port configuration information is found, whether the target port configuration information is correct is detected; or if the target port configuration information is not found, whether the virtual local area network identity VLAN ID parameter corresponding to the target network device in the data link layer is correct is detected based on the upstream port information of the target network device and/or the downstream port information of the upstream device. According to the foregoing solution, after the device information, the network topology path, and the port configuration information are obtained, different port configurations of the network device may be detected layer by layer, so that a network device configuration anomaly can be quickly located.

An embodiment of this application further provides an electronic device, including a memory and a processor, where the memory is configured to store a program; and the processor is coupled to the memory, and configured to execute the program stored in the memory, to implement the method in the embodiment corresponding to FIG. 2.

An embodiment of this application further provides a non-volatile machine-readable storage medium, where the non-volatile machine-readable storage medium stores executable code, and when the executable code is executed by a processor of an electronic device, the processor is enabled to perform the method in the embodiment corresponding to FIG. 2.

A person skilled in the art should understand that the embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product implemented on one or more computer-usable storage media (including but not limited to a disk memory, a CD-ROM, an optical memory, and the like) that include computer-usable program code.

This application is described with reference to the flowcharts and/or the block diagrams of the method, the device (system), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the other programmable data processing device generate an apparatus for implementing a specific function in one or more procedures in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

Alternatively, these computer program instructions may be loaded onto a computer or another programmable data processing device, so that a series of operations and steps are performed on the computer or the other programmable device, to generate computer-implemented processing. Therefore, the instructions executed on the computer or the other programmable device provide steps for implementing a specific function in one or more processes in the flowcharts and/or in one or more blocks in the block diagrams.

In a typical configuration, a computing device includes one or more processors (CPUs), one or more input/output ports, one or more network ports, and one or more memories.

The memory may include a non-persistent memory, a random access memory (RAM), a non-volatile memory, and/or another form in a computer-readable medium, for example, a read-only memory (ROM) or a flash memory (flash RAM). The memory is an example of the computer-readable medium.

The computer-readable medium includes persistent, non-persistent, removable, and non-removable media that can store information by using any method or technology. The information can be a computer-readable instruction, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. Based on the definition in this specification, the computer-readable medium does not include computer-readable transitory media (transitory media) such as a modulated data signal and carrier.

It should also be noted that the term "comprise", "include", or any of their variants are intended to cover a non-exclusive inclusion, so that a process, a method, a product, or a device that includes a list of elements not only includes those elements but also includes other elements that are not expressly listed, or further includes elements inherent to such process, method, product, or device. In absence of more constraints, an element preceded by "includes a . . . " does not preclude existence of other identical elements in the process, method, product, or device that includes the element.

The previous descriptions are merely embodiments of this application, and are not intended to limit this application. A person skilled in the art can make various modifications and changes to this application. Any modification, equivalent replacement, or improvement made without departing from the spirit and principle of the present application shall fall within the scope of the claims in the present application.

What is claimed is:

1. A network anomaly detection method, comprising:
   determining whether a target network device in a to-be-detected network has target port configuration information corresponding to routing and forwarding based on a layer 3 Internet Protocol IP address; and
   determining, based on the target port configuration information, whether the to-be-detected network is anomalous,
   wherein the determining, based on the target port configuration information, whether the to-be-detected network is anomalous comprises:
   when determining that the target port configuration information does not exist, detecting, based on upstream port information of the target network device and/or downstream port information of an upstream device, whether a virtual local area network identity VLAN ID parameter, corresponding to the target network device, in a data link layer is correct; and
   when the VLAN ID parameter, corresponding to the target network device, in the data link layer is incorrect, determining that the to-be-detected network is anomalous.

2. The method according to claim 1, wherein the target port configuration information is information used to configure a target port as an interface.

3. The method according to claim 2, wherein the interface is an interface used for routing.

4. The method according to claim 2, wherein the interface used for routing is one of a physical routing interface and a virtual routing interface.

5. The method according to claim 1, wherein the determining, based on the target port configuration information, whether the to-be-detected network is anomalous comprises:
   when determining that the target port configuration information exists, detecting whether the target port configuration information is correct; and
   when the target port configuration information is incorrect, determining that the to-be-detected network is anomalous.

6. The method according to claim 5, wherein the determining that the target port configuration information exists comprises:

when the target port configuration information is found, determining that the target port configuration information exists.

7. The method according to claim 1, wherein the determining that the target port configuration information does not exist comprises:

when the target port configuration information is not found, determining that the target port configuration information does not exist.

8. The method according to claim 1, wherein the detecting, based on the upstream port information of the target network device and/or the downstream port information of the upstream device, whether the VLAN ID parameter corresponding to the target network device in the data link layer is correct comprises:

detecting a VLAN ID parameter corresponding to the upstream port information of the target network device;

when a detection result for the VLAN ID parameter corresponding to the upstream port information of the target network device is success, detecting a VLAN ID parameter corresponding to the downstream port information of the upstream device of the target network device; and when a detection result for the VLAN ID parameter corresponding to the downstream port information of the upstream device of the target network device is success, determining that the VLAN ID parameter of the target network device in the data link layer is correct.

9. The method according to claim 8, wherein the detecting the VLAN ID parameter corresponding to the upstream port information of the target network device comprises:

configuring a preset value for the VLAN ID parameter corresponding to the upstream port information of the target network device;

transmitting a packet based on the target network device, and obtaining first detection information, wherein the first detection information comprises a first corresponding value of the VLAN ID parameter corresponding to the upstream port information; and detecting whether the first corresponding value is equal to the preset value; and the detecting, based on the upstream port information of the target network device, whether the VLAN ID parameter corresponding to the target network device in the data link layer is correct further comprises:

determining, when the first corresponding value is not equal to the preset value, the detection result for the VLAN ID parameter corresponding to the upstream port information as failure; and the determining whether the to-be-detected network is anomalous comprises:

when the detection result for the VLAN ID parameter corresponding to the upstream port information is failure, determining that the upstream port information is anomalous; and generating a first anomalous information detection result, wherein the first anomalous information detection result comprises the upstream port information of the target network device.

10. The method according to claim 9, wherein the detecting the VLAN ID parameter corresponding to the downstream port information of the upstream device of the target network device comprises:

transmitting a packet based on the target network device, and obtaining second detection information, wherein the second detection information comprises a second corresponding value of the VLAN ID parameter corresponding to the downstream port information of the upstream device; and when the second corresponding value is not zero, detecting whether the second corresponding value is equal to the preset value;

the detecting, based on the downstream port information of the upstream device of the target network device, whether the VLAN ID parameter corresponding to the target network device in the data link layer is correct comprises:

determining, when the second corresponding value is not equal to the preset value, the detection result for the VLAN ID parameter corresponding to the downstream port information of the upstream device as failure; and the determining whether the to-be-detected network is anomalous comprises:

when the detection result for the VLAN ID parameter corresponding to the downstream port information of the upstream device is failure, determining that the downstream port information of the upstream device of the target network device is anomalous; and generating a second anomalous information detection result, wherein the second anomalous information detection result comprises the downstream port information of the upstream device of the target network device.

11. The method according to claim 8, wherein the method further comprises:

when determining that a third corresponding value comprised in third detection information of the to-be-detected network does not correspond to a default value of the VLAN ID parameter corresponding to the upstream port information, generating an anomalous information detection result comprising the upstream port information of the target network device; or when determining that a fourth corresponding value comprised in fourth detection information of the to-be-detected network does not correspond to a default value of the VLAN ID parameter corresponding to the downstream port information of the upstream device, generating an anomalous information detection result comprising the downstream port information of the upstream device of the target network device.

12. The method according to claim 5, wherein the detecting whether the target port configuration information is correct when determining that the target port configuration information exists comprises:

determining whether default routing information is set in a routing table of the target network device; and when determining that the default routing information is not set in the routing table, determining that the target port configuration information is incorrect; and the determining whether the to-be-detected network is anomalous comprises:

when determining that the target port configuration information is incorrect, determining that the to-be-detected network is anomalous; and generating a third anomalous information detection result, wherein the third anomalous information detection result comprises device information of the target network device.

13. The method according to claim 12, wherein the method further comprises:

when determining that the default routing information is set in the routing table, determining whether the default routing information comprises an IP address in the target port configuration information;

when determining that the default routing information comprises the IP address in the target port configuration information, determining whether the routing table comprises a return route and a next hop address of the return route; and when determining that the routing table does not comprise the return route and the next hop address of the return route, generating the third anomalous information detection result.

14. The method according to claim 1, wherein the method further comprises:

generating a network topology diagram based on a network topology structure of the to-be-detected network; and displaying one or more anomalous information detection results in the network topology diagram.

15. The method according to claim 1, wherein the determining whether the target network device in the to-be-detected network has the target port configuration information corresponding to routing and forwarding based on the layer 3 Internet Protocol IP address comprises:

obtaining device information of the target network device;

determining whether the device information comprises routing interface configuration information and/or switch virtual interface configuration information; and when the device information comprises routing interface configuration information and/or switch virtual interface configuration information, determining that the target network device has the target port configuration information.

16. The method according to claim 15, wherein after the determining whether the target network device in the to-bedetected network has the target port configuration information corresponding to routing and forwarding based on the layer 3 Internet Protocol IP address, the method further comprises:

when determining, by searching, that the device information comprises the routing interface configuration information and/or the switch virtual interface configuration information, determining that the target network device in the to-be-detected network has the target port configuration information corresponding to routing and forwarding based on the layer 3 Internet Protocol IP address.

17. The method according to claim 1, wherein the determining whether the target network device in the to-be-detected network has the target port configuration information corresponding to routing and forwarding based on the layer 3 Internet Protocol IP address comprises:

determining, by searching, whether the target network device in the to-be-detected network has the target port configuration information corresponding to routing and forwarding based on the layer 3 Internet Protocol IP address.

18. An electronic device, comprising a memory and a processor, wherein the memory is configured to store a program; and the processor is coupled to the memory, and configured to execute the program stored in the memory, to implement the method according to claim 1.

19. A non-transitory machine-readable storage medium, wherein the non-transitory machine-readable storage medium stores executable code, and when the executable code is executed by a processor of an electronic device, the processor is enabled to perform the method according to claim 1.

* * * * *